Dec. 25, 1934.   G. A. LYON   1,985,378
CONSTRUCTION FOR ORNAMENTING RIMS
Filed Jan. 16, 1932    2 Sheets-Sheet 1
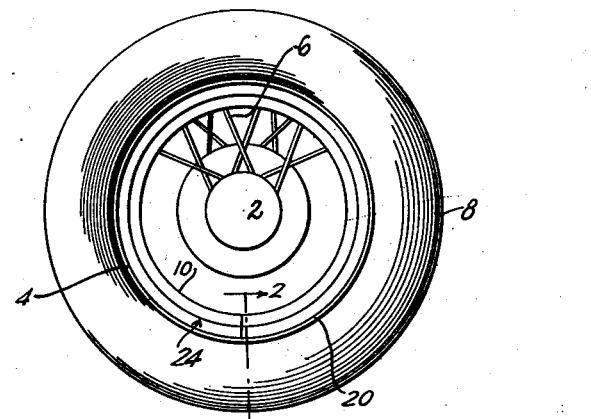
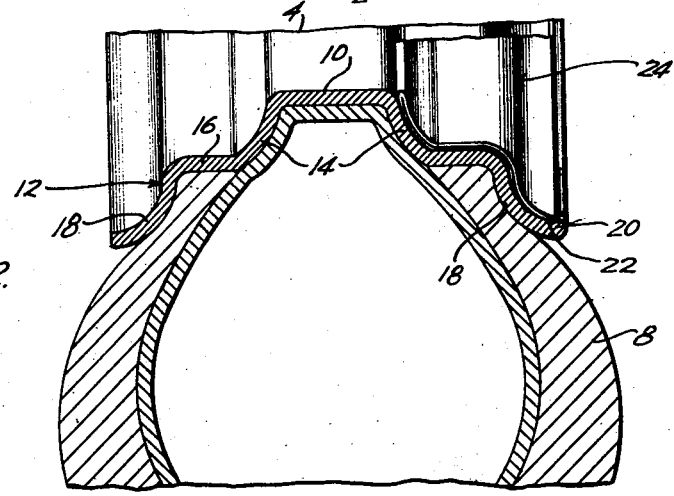
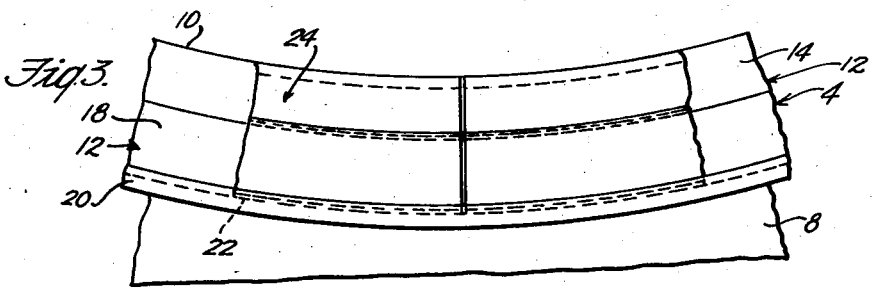
INVENTOR
GEORGE ALBERT LYON
BY HIS ATTORNEYS Dec. 25, 1934.     G. A. LYON     1,985,378
CONSTRUCTION FOR ORNAMENTING RIMS
Filed Jan. 16, 1932     2 Sheets-Sheet 2

INVENTOR
GEORGE ALBERT LYON
BY HIS ATTORNEYS

Patented Dec. 25, 1934

1,985,378

UNITED STATES PATENT OFFICE 1,985,378

CONSTRUCTION FOR ORNAMENTING RIMS

George Albert Lyon, Allenhurst, N. J.

Application January 16, 1932, Serial No. 586,990

12 Claims. (Cl. 41—10)

This invention relates to devices for ornamenting rims of automobiles.

Certain constructions have recently been devised for ornamenting the respective side flanges of the rims of an automobile which occupy the outside positions on the several wheels. These constructions have comprised a ring of sheet metal constructed and arranged to be applied to the outer face of the outer side flange of each rim and secured to said flange. The outer surfaces of the rings are polished or coated with chromium, nickel, or other coating material, and the rings give a very attractive appearance to the car. These rings have been so constructed that they may be readily applied to existing rims.

The principal objects of the present invention are to improve the construction and mode of operation of devices of the above type for ornamenting rims, and to produce an improved device of this character which will give a very attractive appearance to the rim of an automobile wheel and which may be very quickly and easily attached to the outer rim flange and detached therefrom.

With this object in view the invention consists in a construction embodying the novel and improved features hereinafter described and particularly pointed out in the claims, the advantages of which will be readily apparent to those skilled in the art.

The invention will be clearly understood from the accompanying drawings illustrating the invention in its preferred form and the following detailed description of the constructions therein shown.

In the drawings—

Figure 1 is a view in side elevation illustrating an automobile wheel with a construction embodying the invention applied to the rim of said wheel;

Figure 2 is a transverse sectional view of the tire and rim parts taken substantially on the line 2—2 of Figure 1;

Figure 3 is a detail view in side elevation illustrating certain portions of a construction such as that illustrated in Figure 2;

Figure 4:
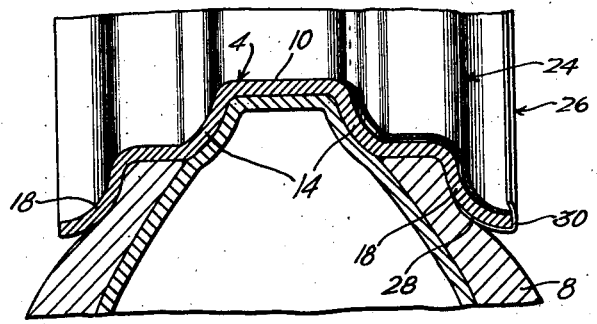
Figure 4 is a view similar to Figure 2 illustrating a construction embodying certain features of the invention in a somewhat different form.

In the drawings, the invention is illustrated as applied to the rim of a wire wheel. This wheel comprises a hub indicated at 2, a rim indicated at 4, and spokes 6 connecting the hub with the rim. A tire 8 is shown mounted on the rim.

In the construction shown in Figs. 1, 2 and 3 the rim 4 comprises a base 10 and side flanges 12 extending obliquely, laterally and outwardly from said base. Each of the side flanges comprises a concavo-convex portion 14 adjoining the base and extending outwardly and laterally therefrom, a portion 16 extending laterally from the portion 14 in the general direction of the axis of the rim, and a concavo-convex portion 18 extending outwardly and laterally from the portion 16. The portion 18 of each flange is provided with a margin indicated at 20 which is turned inwardly toward the axis of the rim thereby forming an annular recess indicated at 22 in the rim flange, and an annular shoulder 23.

The means for ornamenting the rim shown in Figs. 1, 2 and 3 comprises a ring 24 preferably made of relatively thin sheet metal and constructed to be applied over the outer face of a side flange of the rim, as shown in Fig. 2. This ring is preferably made of relatively stiff sheet metal having a relatively light gauge and of a character which resists corrosion, and may be given a high polish. In actual practice a ring made of stainless sheet steel and having a gauge of between .020 and .025 of an inch has been found to give highly satisfactory results. In the construction shown, the ring is formed in cross section to conform to the cross-sectional shape of the side flange of the rim and is made of a width to extend substantially from the shoulder between the base 10 and the portion 14 of the rim flange to the marginal portion of said rim flange, as shown in Fig. 2. The ring however may have various other cross-sectional forms and the dimensions thereof may be varied as desired.

The ornamental ring is preferably made as a split ring having a normal diameter somewhat greater than the corresponding diameter of the rim flange, and is contracted against the resilience of the metal in applying the same to the flange. The ring is preferably so shaped that when applied to a rim, it will contact at its inner margin with the rim substantially at the juncture of the base 10 of the rim and the portion 14 of the side flange, and that its outer margin will engage the rim flange within the annular recess 22 in the concavo-convex portion 18, as shown in Fig. 2, its edge engaging the shoulder 23. The construction of the ornamental ring is preferably such that between its inner and its outer margins it is slightly spaced from the rim flange.

In applying the ornamental ring to a rim flange one end of the ring is applied to the inside of the flange in substantially the position shown in Fig. 2 with the inner margin of the ring engaging the shoulder between the portions 10 and 14 of the flange and with the outer margin of the ring engaging the inner surface of the recess 22, and its outer edge contacting with the shoulder 23, and the ring is then worked around the inside of the rim until it will finally snap into position when released. During this operation the ring is contracted to the inside diameter of the flange. When the ring is completely inserted and is released, the resilience of the metal will tend to cause the same to expand to its original diameter so that the marginal portion thereof is forcibly engaged with the inside surface of the recess 22 in the marginal portion of the rim flange, and its edge with the shoulder 23. The engagement of the marginal portion of the ornamental ring with the inner surface of said recess produced by the spring action of the metal will securely hold the ornamental ring in position on the rim flange. The diameter of the ring is preferably gauged so that the ring is required to be contracted sufficiently in placing it in position with relation to the rim flange to cause it to hold itself securely in position and so that the ring may be readily applied to the rim by a simple, easy manual operation. With steel of about the above gauge, applicant has made the ring of a diameter between one inch and one and one-half inches greater than the diameter of the corresponding portion of the rim flange. The diameter of the ring of course may be varied as required to produce the desired results.

When it is desired to remove the ornamental ring from the flange, one end of the ring is contracted and moved laterally to disengage the same from the flange, and the ring is then worked progressively out of engagement with the flange around the whole circumference of the flange.

Figure 5:
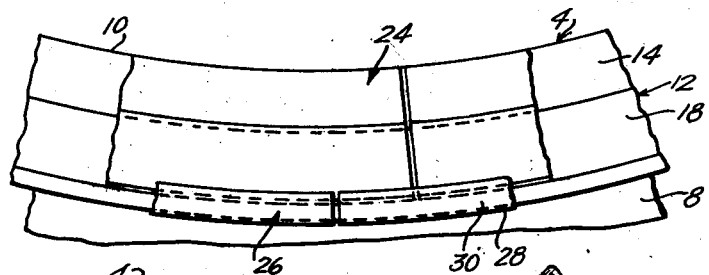
Figure 5 is a detail view in side elevation illustrating certain portions of a construction such as that shown in Figure 4.
Figure 6:
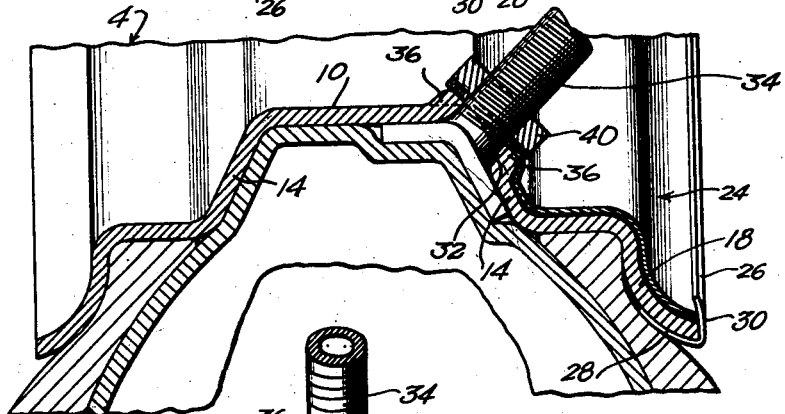
Figure 6 is a transverse sectional view of the tire and rim parts illustrating a construction such as that shown in Figures 4 and 5, said section having been taken in a plane extending substantially through the axis of the valve stem.

In the construction shown in Figs. 4, 5 and 6 the means for ornamenting the rim comprises a ring 24 preferably made of substantially the same material and having the same general construction as the ring 24 shown in Figs. 1, 2 and 3. As shown in Fig. 4, this ring is preferably constructed in cross section so as to extend substantially from the shoulder at the juncture between the base 10 and portion 14 of the rim flange to the outer edge of said flange.

The ring 24 is made in the form of a split ring having a diameter somewhat greater than the corresponding diameter of the rim flange and is contracted so that it will fit within the rim flange in applying it to said flange and securing the same in position. The construction of the ring is preferably such that it will contact with the rim substantially at the juncture between the parts 10 and 14 thereof and that it will be slightly spaced from the rim flange at other points.

The construction shown in Figs. 4, 5 and 6 also comprises a second ring indicated at 26. This second ring preferably has substantially the shape in cross section shown in Fig. 4. As shown in this figure the ring is provided with two flanges 28 and 30 lying at an angle to each other and forming between them an annular recess to receive the marginal portions of the rim flange and the ring 24. The flange 28 of the ring 26 is curved in cross section to correspond to the curvature of the outer surface of the margin of the rim flange and is fitted to said flange between the same and the tire, as shown in Fig. 4. The flange 30 is arranged to extend inwardly from its juncture with the flange 28 in a direction toward the axis of the rim and makes slightly less than a right angle with the flange 28. Thus when the rings 24 and 26 are applied to the rim flange, the flange 30 of the ring 26 will overhang to a slight degree the margin of the ring 24 and the latter ring will be held securely in position on the rim.

The ring 26 is made in the form of a split ring having a normal diameter somewhat less than the outer diameter of the rim flange over which it is fitted. The retaining ring also is preferably made of resilient sheet metal having a relatively light gauge and of a character which resists corrosion and is adapted to receive a high polish. For example, this strip may be made of a strip of stainless sheet steel having substantially the same gauge as the ring 24. The ring 26 is made of a strip of sheet metal of the required width and gauge, rolled or bent into the form of a split ring with the end portions of the ring preferably located in overlapped relation. Since the inside diameter of the ring is made somewhat less than the outside diameter of the rim flange, it is necessary to expand the ring in applying the same to the rim in the manner shown in Fig. 4. The resilience of the metal will cause the ring to contract with considerable force upon the margin of the rim flange and thereby hold itself securely in position.

The resilience of the ring 24 which tends to cause the same to expand forces the marginal portion of the ring with considerable pressure against the inside of the flange 30 of the ring 26 and this force, together with the contracting force of the ring 26, holds both the ornamental ring and the ring 26 in place on the rim flange.

Figure 7:
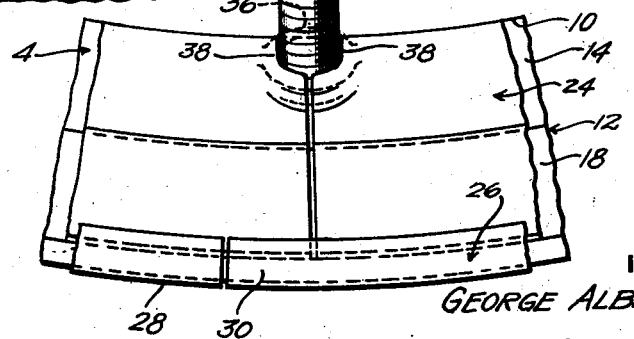
Figure 7 is a detail view in side elevation illustrating certain portions of a construction such as that shown in Figure 6.

As shown in Figs. 6 and 7 certain automobile rims at present manufactured are provided with an opening at one side of the central line of the rim through which the valve stem projects obliquely. In the construction shown in said figures this opening is located at the juncture between the base 10 of the rim and one of the side flanges. As shown in these figures the rim is provided with an opening 32 through which is passed the stem 34 of the valve. The rim is formed with an out-turned wall 36 surrounding this opening.

In order to accommodate itself to the opening 32 in the rim and to the out-turned wall 36 surrounding this opening, the ornamental ring 24 is applied to the rim with the ends thereof separated by the split opposite the said opening and each of the ends of the ring is cut away as at 38 to accommodate the out-turned wall 36. As shown in Figure 6, the portion of the ring adjacent the wall 36 of the rim is turned inwardly to conform to and fit said wall 36.

As in the usual construction, a nut 40 is threaded on the valve stem and is turned down tightly against the upper face of the wall 36 of the rim to secure the valve to the rim and to assist in holding the inner tube in place. In the construction shown in the drawings the nut 40 engages the upper face of the out-turned portions of the ring 24 adjacent the wall 36 and this nut therefore assists in holding the ornamental ring in place on the rim.

It is to be understood that the invention is not limited to the particular construction and arrangement of parts of the illustrated embodiments of the invention, but that the invention may be embodied in other forms within the scope of the claims.

Having explained the nature and object of the invention, and having specifically described a construction embodying the invention in its preferred form, what is claimed is:

1. A construction for ornamenting rims comprising an ornamental split ring of relatively stiff resilient material having a normal diameter larger than the inside diameter of the rim flange, arranged to overlie the outer surface of said rim flange and having its ends unconnected so as to be resilient and having its outer margin resiliently engaging in an annular recess in the rim flange, said ring when in place on said rim flange having its ends tending to be separated by reason of the constant inherent tendency of the ring to expand, whereby the ring is held in tight engagement with the rim flange.

2. A construction for ornamenting rims comprising an ornamental split ring of relatively stiff resilient material having a normal diameter larger than the inside diameter of the rim flange and constructed to conform in cross section to the shape of the outer surface of said rim flange and arranged to overlie said outer surface of the rim flange, and having its outer margin engaging in a recess in the flange.

3. A construction for ornamenting rims comprising a split ring of relatively stiff resilient sheet metal arranged to be applied to the outer surface of a rim flange with its outer margin engaging in a recess at the outer margin of the flange and contacting with the rim at the inner and outer margins of the ring and spaced from the rim at other points, said ring having a normal outside diameter greater than the outside diameter of the rim flange to which it is applied, and adapted to be held in position on the flange by the resilience of said ring.

4. A construction for ornamenting rims comprising an ornamental split ring of relatively stiff resilient material arranged to be applied to the outer surface of a rim flange and having a normal outside diameter greater than the outside diameter of said flange, and a split ring of similar material having a normal diameter less than the outside diameter of the rim flange, and provided with a recess to receive the marginal portions of said rim flange and said ornamental ring.

5. A construction for ornamenting rims comprising an ornamental ring arranged to be applied to the outer side surface of a rim flange and to be engaged by a nut on the valve stem to assist in holding the ornamental ring in position on the rim.

6. A construction for ornamenting rims comprising an ornamental split ring of relatively stiff resilient material arranged to be applied to one side surface of a rim flange and having a normal outside diameter greater than the outside diameter of said flange, and a split ring of similar material arranged to engage the marginal portions of the rim flange and said first ring, and having a normal diameter less than the outside diameter of said flange so as to hold itself and the first ring in position on the rim by the contracting force of the material of the latter ring.

7. A construction for ornamenting rims comprising a plurality of circular rings each of curved cross section for disposition over a flanged part of the rim, said rings being relatively movable for interlocking cooperation with each other so that one of said rings engages the marginal rim flange to retain itself as well as the other ring in proper position on the rim flange.

8. A construction for ornamenting rims comprising a plurality of circular rings each of curved transverse cross section so as to embrace a marginal flanged portion of the rim, one of said rings overlying an exposed surface of said flange and the other ring engaging over the marginal part of the flange as well as an inner marginal portion of the other ring to retain said other ring in proper position on the rim.

9. In combination with a rim structure affording a substantially radially inwardly projecting portion at its outer margin, a construction for ornamenting the rim structure, said construction comprising a resilient split ring of greater normal diameter than said portion and expansible and contractible so as to enable the same to be readily applied to the rim structure and be held by its resilience in engagement with said rim structure inwardly of said portion, said portion serving as a retainer for the ring to prevent accidental separation of the ring from the rim structure.

10. In combination with a tire rim provided with retaining means at a flange thereof, a resilient split ring engageable with the inner periphery of the flange and of greater normal diameter than said periphery of the rim flange and contractible into engagement therewith, said ring being arranged when so engaged to be farther than the retaining means from the free edge of the flange so as to engage and be retained by said means against accidental loss from the rim, said retaining means comprising an inwardly projecting portion on the flange of said rim.

11. The combination with a wheel structure of an ornamental split radially contractible and expansible bead ring therefor held in cooperation with said structure by the inherent tendency of the bead to spring outwardly under tension, said structure having a surface provided with retaining means projecting beyond said surface and said bead having a flange formed to extend into holding engagement with said retaining means.

12. In a wheel structure having a surface provided with retaining means projecting beyond said surface, a bead construction for ornamenting said structure and cooperable with said means comprising a resilient radially contractible and expansible split ornamental ring having a portion disposed under said means to be held thereunder by the inherent tendency of the ring to spring outwardly.

GEORGE ALBERT LYON.